United States Patent [19]

Minor et al.

[11] Patent Number: 5,570,400
[45] Date of Patent: Oct. 29, 1996

[54] ON LINE SIPPING AIR DELIVERY SYSTEM

[75] Inventors: David M. Minor, Lynchburg; Ronald N. Roseveare, Evington, both of Va.

[73] Assignee: B&W Fuel Company, Lynchburg, Va.

[21] Appl. No.: 512,589

[22] Filed: Aug. 8, 1995

[51] Int. Cl.$^6$ .................................................. G21C 17/00
[52] U.S. Cl. .......................... 376/253; 376/250; 376/251; 376/245
[58] Field of Search ..................................... 376/253, 250, 376/251, 245; 976/DIG. 218, DIG. 219, DIG. 282

[56] References Cited

U.S. PATENT DOCUMENTS

| | | | |
|---|---|---|---|
| 3,801,441 | 4/1974 | Jones | 376/253 |
| 4,034,599 | 7/1977 | Osborne | 73/40.7 |
| 4,416,847 | 11/1983 | Saito et al. | 376/253 |
| 4,521,372 | 6/1985 | Price et al. | 376/250 |
| 4,522,780 | 6/1985 | Shallenberger et al. | 376/260 |
| 4,668,467 | 5/1987 | Miler et al. | 376/282 |
| 4,696,788 | 9/1987 | Seli | 376/253 |
| 5,235,624 | 8/1993 | Bordy et al. | 376/253 |
| 5,414,742 | 5/1995 | Hornak et al. | 376/251 |
| 5,457,720 | 10/1995 | Snyder et al. | 376/253 |

*Primary Examiner*—Charles T. Jordan
*Assistant Examiner*—Meena Chelliah
*Attorney, Agent, or Firm*—Robert J. Edwards; D. Neil LaHaye

[57] ABSTRACT

An on-line sipping air delivery system that propels bubbles across the entire surface of the fuel assembly. A pump delivers liquid through an aspirator located near the bottom of the fuel handling mast. Liquid flow through a venturi in the aspirator causes a drop in pressure inside the aspirator and pulls air into the aspirator through an ambient air line that extends above the surface of the liquid. The air is mixed with liquid as it flows through the aspirator and the mixture is injected under the fuel assembly through nozzles positioned at the bottom of the assembly. Suction nozzles above the liquid level at the top of the fuel assembly are used in a conventional manner to capture and deliver the released air and gases to appropriate testing equipment.

1 Claim, 2 Drawing Sheets

ON LINE SIPPING AIR DELIVERY SYSTEM

BACKGROUND OF THE INVENTION

1. Field of the Invention

The invention is generally related to the inspection of nuclear fuel assemblies and more particularly to the detection of leaking fuel assemblies.

2. General Background

During nuclear reactor operation, gaseous fission products are formed inside the fuel rods, which are pressurized with an inert gas during manufacture. If a breach occurs in the fuel rod cladding, the fission gases may escape. It is very important to nuclear utility operators that all leaking fuel be identified, so that the leaking fuel can be repaired or removed from service. Leaking fuel results in the release of fission products into the plant coolant system, which causes increased radiation exposure to plant personnel and equipment, and may cause expensive cleanup operations. On-line sipping is a method used to detect leaking fuel assemblies in nuclear power plants. The on-line sipping system is designed to detect these gases during fuel offload from the reactor core. As the assembly is lifted from the core and into the fuel handling mast, the drop in external hydrostatic pressure will allow the fission gases to escape. On-line sipping differs from other testing methods where the fuel assembly is removed from the reactor and placed in a closed container where it is then necessary to drive the gas from any failed fuel rods by the use of heat or a vacuum. A typical on-line sipping system utilizes two or four nozzles to inject air under the fuel assembly while it is being lifted into the fuel handling mast. The air helps to move the fission gases to the surface of the water, where the air/gas mixture is vacuumed off and passed by a gamma radiation detector which identifies gamma-emitting fission products. The air injection system typically utilizes an air compressor or plant compressed air supply, air lines, and two or four injection nozzles to direct air horizontally under the fuel assembly during inspection. The nozzles are sized to produce small diameter air bubbles that should cover the entire bottom surface of the fuel assembly and travel upward throughout the entire assembly. These bubbles, as they travel up through the assembly to the water surface, will capture fission gases that are held to the fuel assembly by surface tension. These bubbles also create water turbulence which helps to drive fission gases to the water surface. It has been observed, that even with various sized air injection nozzles, air flows, and pressures, complete coverage of the bottom of the fuel assembly is not feasible. This is due to the lack of momentum of the air bubbles and the resistance of the water. Rather than spreading to cover the entire fuel assembly, the air is only delivered to the local areas where the nozzles are located, and as the air bubbles travel upward through the fuel assembly, they do not spread out through the assembly. This reduces the efficiency of the detection and could cause a leaking fuel assembly to escape detection. In an effort to improve the bubble distribution, some suppliers of on-line sipping systems have utilized four nozzles rather than two. This approach delivers air to each corner of the assembly but still does not approach complete coverage. Another problem with the conventional method is the high potential for the nozzles to become partially or completely obstructed, further reducing the efficiency of fission gas detection. Even small debris within the supply air lines can become lodged in the nozzles because the nozzle openings are normally very small.

SUMMARY OF THE INVENTION

The invention addresses the above problems. What is provided is an on-line sipping air delivery system that propels bubbles across the entire surface of the fuel assembly with only two nozzles. A pump delivers water through an aspirator located near the bottom of the fuel handling mast. Water flow through a venturi in the aspirator causes a drop in pressure inside the aspirator. The pressure drop causes air to be pulled into the aspirator through an ambient air line that extends above the surface of the water. The air is mixed with water as it flows through the aspirator and the mixture is injected under the fuel assembly through nozzles positioned at the bottom of the assembly. The aspirators used have relatively large openings and are not susceptible to debris entrapment. Suction nozzles above the water level at the top of the fuel assembly are used in a conventional manner to deliver the released air and gases to appropriate testing equipment.

BRIEF DESCRIPTION OF THE DRAWINGS

For a further understanding of the nature and objects of the present invention reference should be made to the following description, taken in conjunction with the accompanying drawing in which like parts are given like reference numerals, and wherein.

DETAILED DESCRIPTION OF THE PREFERRED EMBODIMENT

Figure 1:
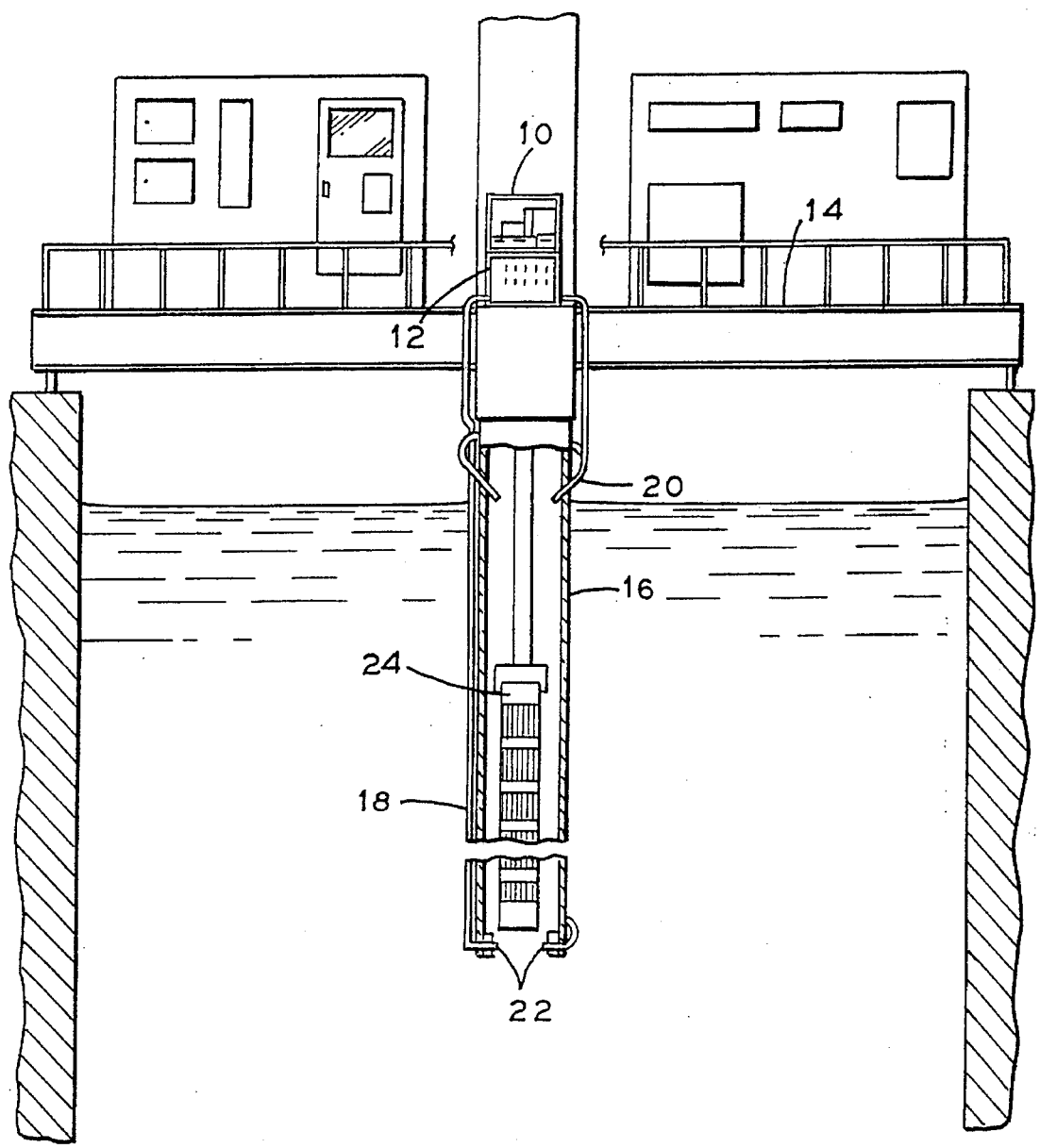
FIG. 1 is a partial sectional side view of a typical on-line sipping and air delivery system.

Referring to the drawings, FIG. 1 illustrates a typical on-line sipping and air delivery system. The system includes electronic control cabinet 10, pneumatic/detector cabinet 12, air injection line 18, air suction line 20, and air injection nozzles 22. Fuel handling bridge 14 and fuel handling mast 16 are part of the site fuel handling equipment and, although required for use with the sipping system, are not specifically part of the sipping system. Fuel handling mast 16 is typically a circular or rectangular structure open at the lower end for grasping and surrounding fuel assembly 24 as it is raised from the reactor core. As fuel assembly 24 is lifted from the reactor core and into fuel handling mast 16 at a shallower water depth, the drop in external hydrostatic pressure will allow fission gases to escape through any defective sheaths in the fuel rods in fuel assembly 24. The on-line sipping system utilizes two or four air injection nozzles 22 that are in fluid communication with air injection line 18 to inject air under fuel assembly 24 while it is being lifted into fuel handling mast 16. The air helps to move the fission gases to the surface of the water, where the air/gas mixture is vacuumed off by air suction lines 20 and passed by a gamma radiation detector which identifies gamma-emitting fission products. Even when nozzles 22 are placed at each corner of fuel assembly 24, the lack of momentum of the air bubbles combined with the resistance of the water results in the air bubbles not covering the entire fuel assembly.

Figure 2:
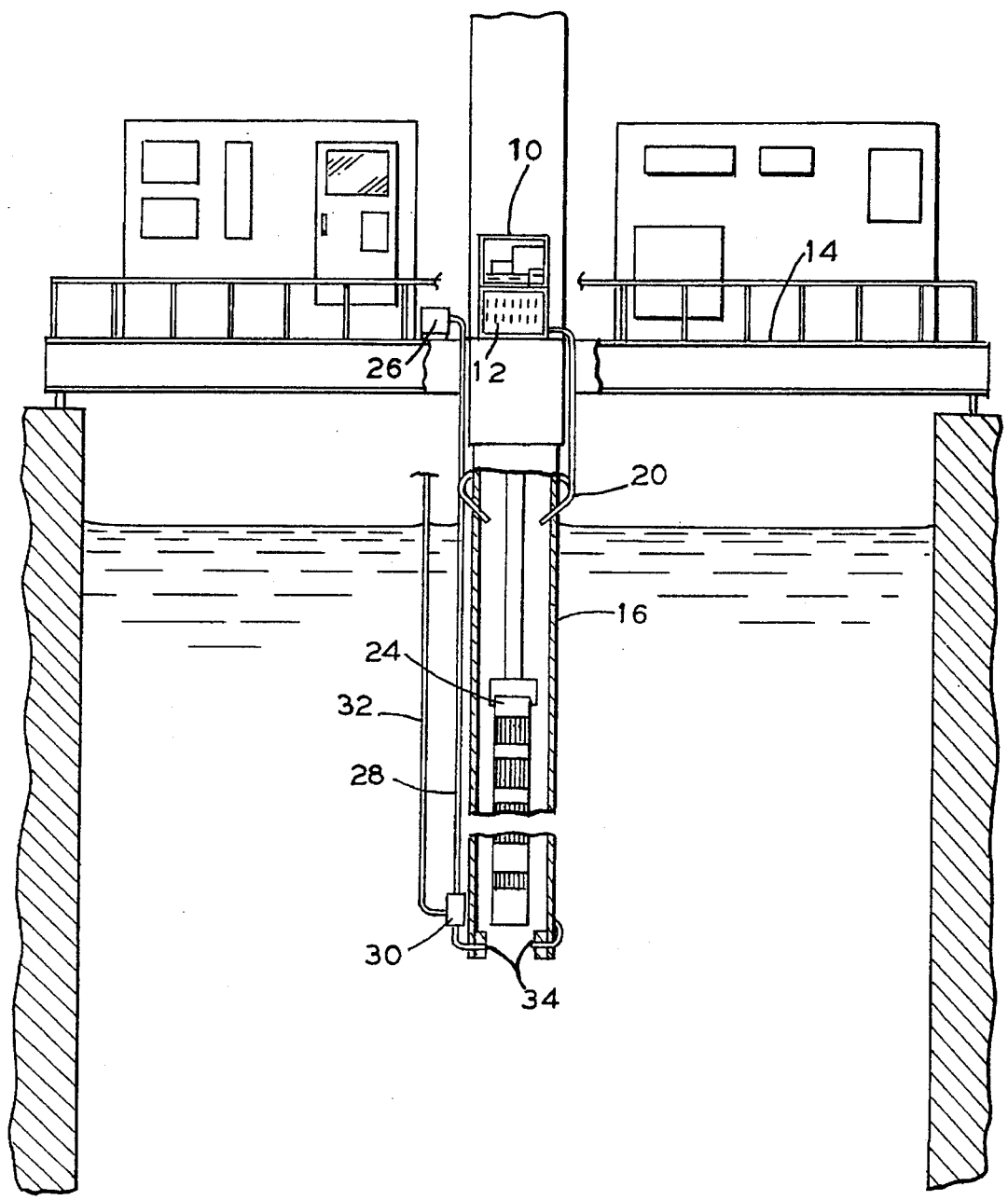
FIG. 2 is a partial sectional side view of an on-line sipping and air delivery system that incorporates the invention.

The invention is illustrated in FIG. 2 and is generally indicated by numeral 26. Improved on-line sipping and air delivery system 26 includes many of the same components of the system of FIG. 1, the electronic control cabinet 10, pneumatic/detector cabinet 12, fuel handling bridge 14, fuel handling mast 16, and air suction line 20. Instead of directly injecting air bubbles underneath fuel assembly 24, the invention includes a pump 26, fluid injection line 28, aspirator 30, ambient air line 32, and water/air injection nozzles 34.

Pump 26 delivers water through fluid injection line 28 to aspirator 30 located near the bottom of mast 16. Inside aspirator 30, water flows through a venturi which causes a drop in pressure inside aspirator 30. Ambient air line 32 is in fluid communication with aspirator 30 and extends above the surface of the water. Due to the pressure drop in aspirator 30, air is pulled into aspirator 30 through ambient air line 32 and is mixed with water flowing through aspirator 30. The water/air mixture flows through aspirator 30 and into water/air injection nozzles 34 which inject the water/air mixture under fuel assembly 24.

Tests have shown that when the air flow of the invention is set at one hundred twenty-five liters per hour at a pressure of seven bar and the water flow rate is four liters per minute, which is the same air flow rate as the prior art air delivery system of FIG. 1, the greater weight and momentum of the water carries the entrained air over the entire bottom of fuel assembly 24. This is accomplished in the invention with the use of only two water/air injection nozzles 34, as opposed to the use in the prior art of four air injection nozzles 22 which still do not provide complete coverage of the fuel assembly. The prior art air injection nozzles require very small holes, typically 0.008 inch, to develop the maximum air velocity. During the long periods of time between uses of the system, the small holes may become clogged due to debris or boron crystals which form due to the presence of boron in the reactor coolant system. If the nozzles become clogged, the air injection system will be rendered inoperable. Consequently, the utility must clean or replace the nozzles prior to each use of the system. The invention is capable of utilizing much larger nozzle openings, typically 0.25 inch, which are much less susceptible to clogging from debris or boron crystals. This minimizes or eliminates the need for maintenance on the nozzles prior to each fuel outage and testing campaign.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An on-line sipping air delivery system for detecting defective fuel element sheaths in a nuclear fuel assembly, comprising:

a. a fluid line having a nozzle positioned to direct liquid flow from the nozzle under the nuclear fuel assembly;

b. a pump positioned to deliver liquid into said fluid line and through the nozzle in said fluid line; and c. an aspirator in operative connection with said fluid line, said aspirator having a venturi connected to an ambient air line whereby liquid flow through said aspirator causes ambient air to be drawn into said line and mixed with the liquid therein.

* * * * *